United States Patent [19]

Savins et al.

[11] 4,042,030
[45] Aug. 16, 1977

[54] OIL RECOVERY BY VISCOUS WATERFLOODING

[75] Inventors: Joseph George Savins; Ralph F. Burdyn; Jerry M. Waite, all of Dallas, Tex.

[73] Assignee: Mobil Oil Corporation, New York, N.Y.

[21] Appl. No.: 689,445

[22] Filed: May 24, 1976

[51] Int. Cl.² .......................................... E21B 43/22
[52] U.S. Cl. .................... 166/273; 166/274; 252/8.55 D
[58] Field of Search ............... 166/273, 270, 274, 275, 166/305 R, 272; 252/8.55 D

[56] References Cited

U.S. PATENT DOCUMENTS

| | | | |
|---|---|---|---|
| 3,275,075 | 9/1966 | Gogarty et al. | 166/274 |
| 3,297,084 | 1/1967 | Gogarty et al. | 166/274 X |
| 3,330,343 | 7/1967 | Tosch et al. | 166/274 X |
| 3,493,051 | 2/1970 | Gogarty | 166/274 |
| 3,506,071 | 4/1970 | Jones | 166/273 |
| 3,637,017 | 1/1972 | Gale et al. | 166/274 |
| 3,983,940 | 10/1976 | Carpenter et al. | 166/274 X |

OTHER PUBLICATIONS

Jones, S. C. et al., "Cosurfactants in Micellar Systems Used for Tertiary Oil Recovery", 5PE Paper 5566, 50th Annual Fall Meeting of SPE of AIME, Dallas, Texas, Sept. 28 - Oct. 1, 1975.
Gilliland, H. E. et al., "Pilot Flood Mobilizes Residual Oil", The Oil and Gas Journal, Jan. 1976, pp. 43-47.

Primary Examiner—Stephen J. Novosad
Attorney, Agent, or Firm—C. A. Huggett; William D. Jackson

[57] ABSTRACT

Waterflooding process for the recovery of oil in which at least a portion of the injected water is thickened by the addition of a sulfonate surfactant and a $C_4$-$C_6$ aliphatic alcohol having a hydrocarbon chain link of at least 3 carbon atoms. The action of the surfactant-alcohol system in increasing the viscosity of the water varies with the monovalent salt salinity of the water and the ratio of the amount of the sulfonate surfactant to the sum of the amounts of the sulfonate surfactant and alcohol in the water. A relatively viscous aqueous mobility control slug containing a sulfonate-alcohol system as previously described may be preceded by an aqueous surfactant slug. The aqueous solution of sulfonate surfactant and alcohol may be formulated and then aged for a time to allow the development of viscosity prior to injection into the oil reservoir. This viscosity development may be accelerated by heating.

21 Claims, 15 Drawing Figures

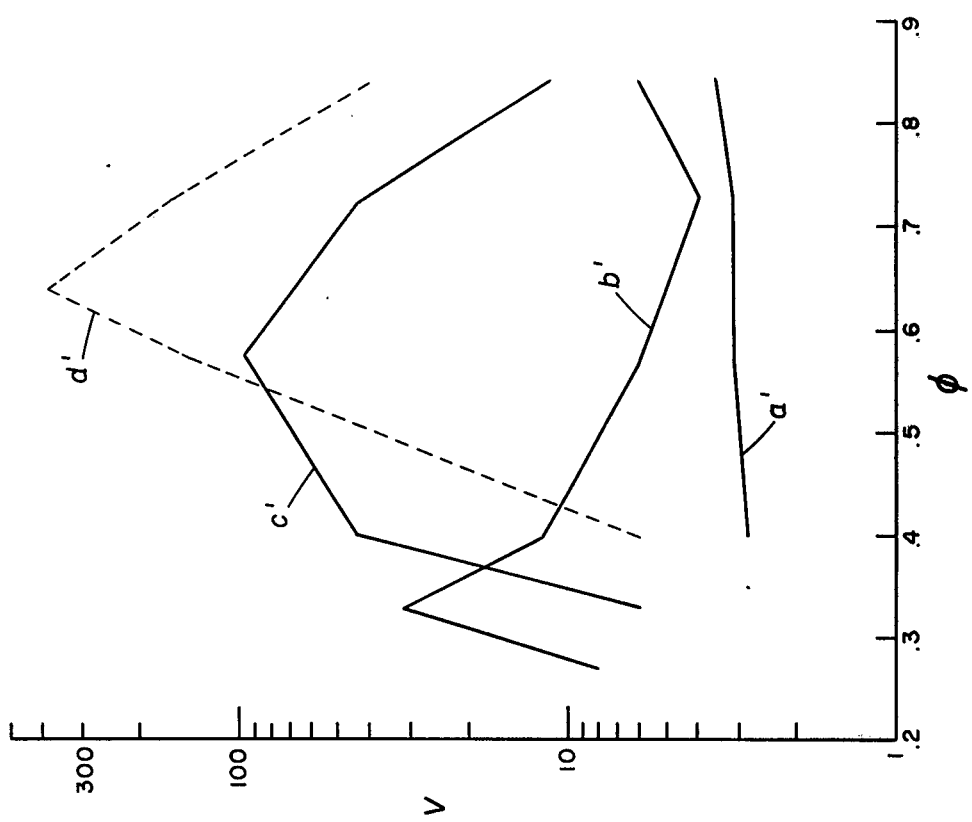
FIG. IB
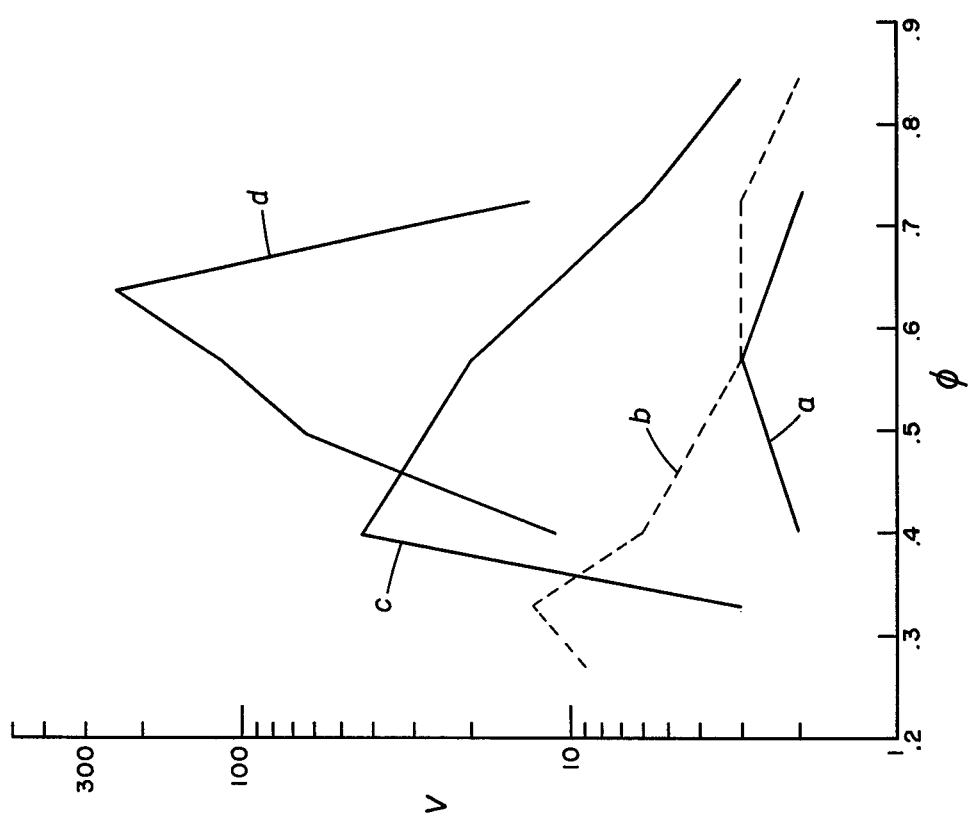
FIG. IA

FIG. 12
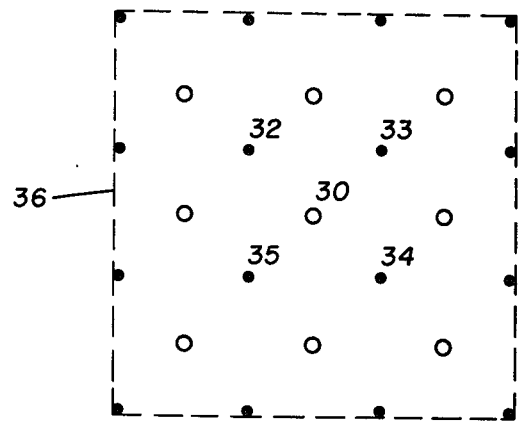
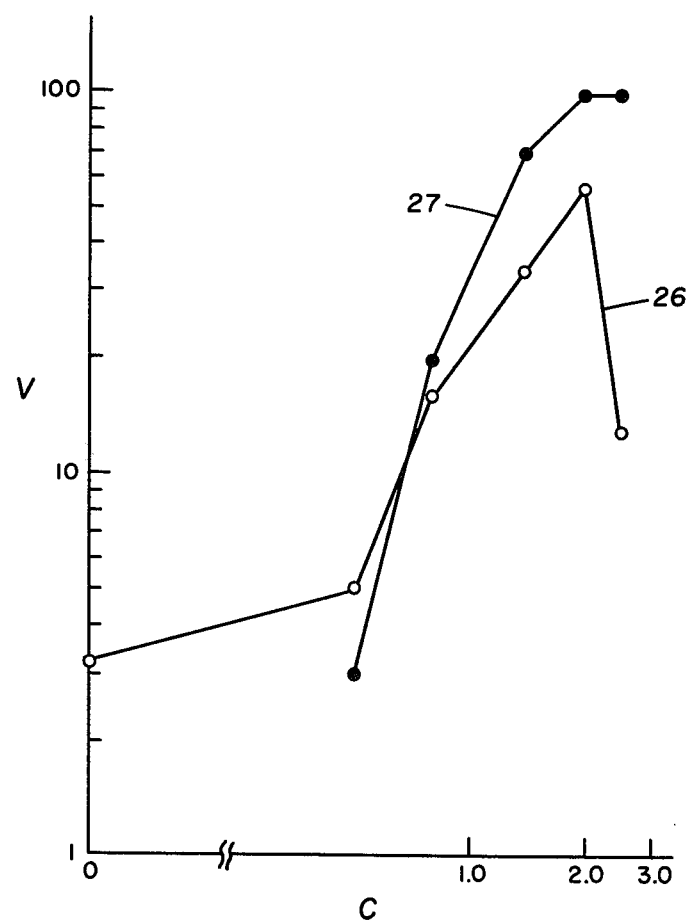
FIG. 11

OIL RECOVERY BY VISCOUS WATERFLOODING

BACKGROUND OF THE INVENTION

This invention relates to the recovery of oil from subterranean oil reservoirs and more particularly to improved waterflooding operations involving the injection of a viscous aqueous liquid formed by interaction of a sulfonate surfactant and a water-soluble aliphatic alcohol.

In the recovery of oil from oil-bearing reservoirs, it is usually possible to recover only minor portions of the original oil in place by the so-called primary recovery methods which utilize only the natural forces present in the reservoir. Thus a variety of supplemental recovery techniques has been employed in order to increase the recovery of oil from subterranean reservoirs. The most widely used supplemental recovery technique is waterflooding which involves the injection of water into an oil-bearing reservoir. As the water moves through the reservoir, it acts to displace oil therein to a production system composed of one or more wells through which the oil is recovered.

It has long been recognized that factors such as the interfacial tension between the injected water and the reservoir oil, the relative mobilities of the reservoir oil and injected water, and the wettability characteristics of the rock surfaces within the reservoir are factors which influence the amount of oil recovered by waterflooding. Thus it has been proposed to add surfactants to the injected water in order to lower the oil-water interfacial tension and/or to alter the wettability characteristics of the reservoir rock. Also, it has been proposed to add thickening agents to all or part of the injected water in order to increase the viscosity thereof, thus decreasing the mobility ratio between the injected water and oil and improving the sweep efficiency of the waterflood.

Processes which involve the injection of aqueous surfactant solutions in order to reduce the oil-water interfacial tension are commonly referred to as low tension waterflooding techniques. To date one of the more promising low tension waterflooding techniques involves the injection of aqueous solutions of petroleum sulfonate within a designated equivalent weight range and under controlled conditions of salinity. For example, in a paper by W. R. Foster entitled "A Low-Tension Waterflooding Process", Journal of Petroleum Technology, Vol. 25, Feb. 1973, pp 205-210, there is disclosed a procedure which involves the sequential injection of a protective slug, a surfactant slug, and a mobility control slug. The protective slug is an aqueous solution of sodium chloride which is injected in order to displace the reservoir water ahead of the subsequently injected surfactant slug. This slug is substantially free of divalent ions which would tend to precipitate the surfactant slug. It, as well as the surfactant slug, may contain inorganic sacrificial agents such as sodium carbonate and/or sodium tripolyphosphate which function to improve the water wettability of the reservoir rock surfaces and reduce adsorption of the surfactant.

The surfactant slug comprises an aqueous solution of petroleum sulfonates having an average molecular weight within the range of 350-500 and contains sodium chloride in a concentration, typically about 1.0 to 2.0 weight percent, which will promote the desired low interfacial tension between the injected water and the reservoir oil. The subsequently injected thickened water slug contains a viscosifier such as a water-soluble biopolymer in a graded concentration in order to provide an initial viscosity greater than the viscosity of the reservoir oil and a terminal viscosity near that of water. Thereafter a driving fluid such as produced field brine is injected in order to carry the process to conclusion.

Another approach to the enhanced recovery of oil involves the injection of a water-oil-surfactant system referred to generally as a "microemulsion" or a "micellar solution". This system is defined by Healy et al., "Physicochemical Aspects of Microemulsion Flooding", SPE Paper 4583, 48th Annual Fall Meeting of the SPE of AIME, Las Vegas, Sept. 30-Oct. 3, 1973, as a "stable, translucent micellar-solution of oil, water that may contain electrolytes, and one or more amphiphilic compounds (i.e., surfactants, alcohols, etc.)".

U.S. Pat. No. 3,506,071 to Jones discloses an oil recovery process employing water external micellar dispersions. The patentee refers to the term "micellar dispersion" as including "micellar solutions", "water-external 'micro-emulsion'", and "'transparent' emulsions". Regardless of the terminology used, such microemulsions or micellar systems generally contain, in addition to water, oil and surfactants, co-surfactants such as alcohols, and electrolytes. For example, the aforementioned patent to Jones refers to the volume amounts of these various constituents as being about 1 percent to about 50 percent of hydrocarbon, from about 40 percent to about 95 percent aqueous medium, at least about 4 percent petroleum sulfonate, from about 0.01 percent to about 5 percent of a co-surfactant such as butanol, pentanol, or hexanol, and up to about 4 percent by weight of electrolyte. Electrolytes which are said to be useful in Jones include inorganic bases such as sodium hydroxide, salts such as sodium chloride, and inorganic acids such as hydrochloric acid. The patentee notes that acids and neutral salts are preferred when the system contains hydrophilic sulfonates and where high reservoir temperatures are involved, whereas electrolytes such as sodium hydroxide which yield a higher pH are preferred with the more oleophilic sulfonates.

Micellar solutions like the more widely encountered macroemulsions may exhibit viscosities which are significantly higher than the viscosities of their oil-water components. For example, the above-mentioned article by Healy et al. discusses the effect of co-surfactant on microemulsion viscosity and illustrates three phase diagrams in FIGS. 7, 11 and 14 which show the viscosities observed for different oil, water, and surfactant (or/and co-surfactant) systems. Healy et al, note that one way to decrease viscosity is to add an amphiphilic compound such as an alcohol to the surfactant. The patent to Jones, while it does not discuss micellar dispersion viscosity, gives the viscosity for certain micellar dispersion systems set forth in Table V of the patent.

A more recent paper by Jones and Dreher, "Co-Surfactants in Micellar Systems Used for Tertiary Oil Recovery", SPE Paper 5566, 50th Annual Fall Meeting of the SPE of AIME, Dallas, Texas, Sept. 28-Oct. 1, 1975, discusses various effects which alcohol co-surfactants have on the viscosities of micellar system. Jones and Dreher state that in high water concentration micellar systems, e.g. 70 percent water, the more water-soluble co-surfactants produce lower viscosity micellar slugs than the less water-soluble alcohols. The authors conclude that "alcohol addition is a convenient way to tailor micellar slugs for optimizing oil recovery and secondary and tertiary displacements and to adjust viscosity to meet mobility requirements".

Another enhanced oil recovery process employing alcohols and surfactants is disclosed in U.S. Pat. No. 3,637,017 to Gale et al. Surfactants disclosed for use in the Gale et al. process include sodium petroleum sulfonates having average molecular weights within the range of 465–480 and alcohols disclosed by the patentees include aliphatic alcohols having from 1 to 8 carbon atoms. As disclosed, for example, in column 5, line 46 et seq. of the Gale et al. patent, the surfactant and alcohol may be simultaneously injected in an aqueous solution or the surfactant solution may be injected first and then followed by an aqueous solution of alcohol. Also the alcohol may be included in both the surfactant solution and in the subsequently injected displacing water following the surfactant solution.

Gilliland et al., "Pilot Flood Mobilizes Residual Oil", The Oil and Gas Journal, January 1976, pp. 43–47, describe a surfactant waterflood in which the surfactant slug contained 2.5 percent sodium sulfonate and 3.0 percent alcohol. In regard to viscosity, the authors conclude that the viscosity of the surfactant can be altered by several means including variation in the surfactant concentration altering the ratio of sulfonate to alcohol in the surfactant, or by the addition of polymer. The authors conclude that the salinity adjustment per se is not a very effective means of viscosity adjustment.

SUMMARY OF THE INVENTION

In accordance with the present invention, there is provided a new and improved waterflooding process in which at least a portion of the injected water is thickened by employing an alkyl aryl sulfonate surfactant having an average molecular weight within the range of 350–500 in combination with a water-soluble $C_4$-$C_6$ aliphatic alcohol having a hydrocarbon chain length of at least 3 carbon atoms. The thickened aqueous liquid exhibits a monovalent salt salinity within the range of 0.5–3.0 weight percent and contains the sulfonate surfactant in a concentration within the range of 0.5–4.0 weight percent. Preferably the salinity and surfactant concentrations are within the ranges of 0.8–2.5 and 0.5–3.0 weight percent, respectively. The aliphatic alcohol is present in a concentration such that the ratio of the sulfonate surfactant in the aqueous liquid to the sum of the amount of sulfonate surfactant and alcohol in the liquid is within the range of 0.3–0.8.

In one embodiment of the invention, an aqueous surfactant slug containing a sulfonate surfactant is introduced into the reservoir via a suitable injection system. Thereafter an aqueous mobility control slug having a viscosity greater than the of the surfactant slug is introduced into the reservoir through the injection system. The mobility control slug has a monovalent salt salinity within the range of 0.5–3.0 weight percent and contains a sulfonate surfactant and a water-soluble $C_4$-$C_6$ aliphatic alcohol in concentrations within the ranges described previously. Subsequent to the injection of the mobility control slug, an aqueous flooding medium is injected into the reservoir via the injection system in order to displace reservoir oil to a spaced production system from which the oil is recovered.

In a further aspect of the invention, there is provided a process for forming the viscous aqueous fluid through an aging technique prior to its injection into the reservoir. In this aspect of the invention, an aqueous fluid is formulated containing a monovalent salt, sulfonate surfactant, and a water-soluble $C_4$-$C_6$ aliphatic alcohol as described previously. The fluid thus formulated is aged for a period of time to allow its viscosity to increase to the desired level. Thereafter the aged viscous fluid is introduced into the reservoir in the oil recovery process.

BRIEF DESCRIPTION OF THE DRAWINGS

FIGS. 1A and 1B are graphs illustrating the relationship between viscosity and relative surfactant and alcohol concentrations for systems in which the alcohol component is isobutyl alcohol.

FIG. 11 is a graph illustrating the relationship between viscosity and salinity for a system comprising n-butyl alcohol and a commercially available petroleum sulfonate and a system comprising-butyl alcohol and an oil-free petroleum sulfonate.

FIG. 12 is an illustration showing one type of well pattern which may be employed in carrying out the invention.

DESCRIPTION OF SPECIFIC EMBODIMENTS

Figure 2B:
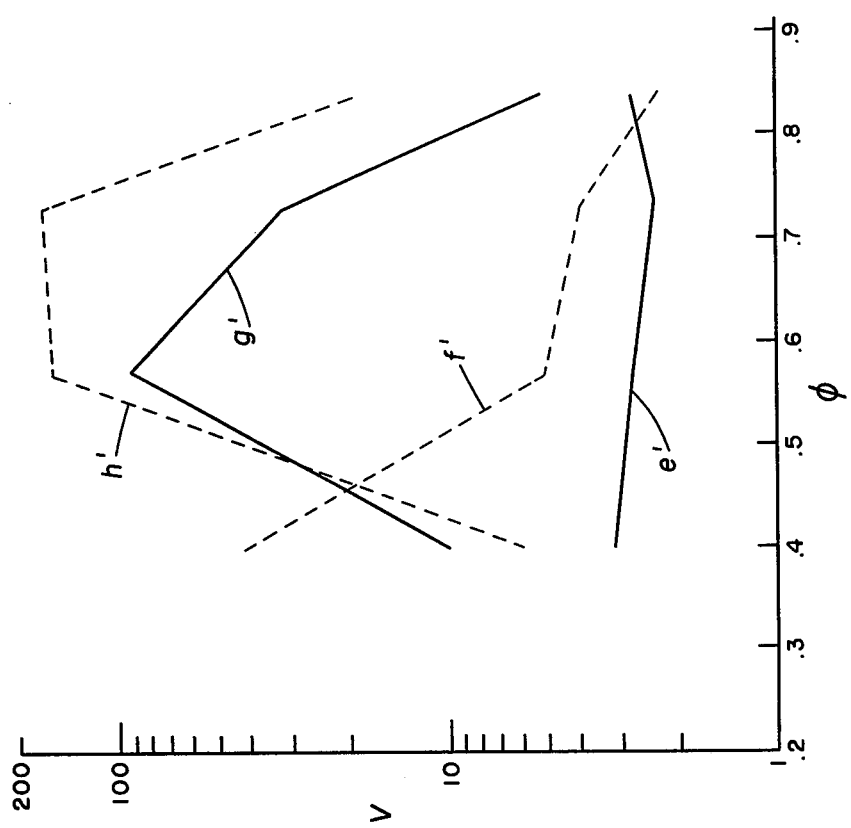
FIGS. 2A and 2B are graphs illustrating the relationship between viscosity and relative surfactant and alcohol concentrations for systems in which the alcohol component is n-butyl alcohol.

The present invention results from the discovery that a thickening effect may be achieved by employing a sulfonate surfactant in an aqueous saline solution in combination with certain aliphatic alcohols within prescribed relative concentration ranges. This phenomenon is time and temperature dependent in the sense that the thickening action of the surfactant-alcohol system occurs upon aging of these components in aqueous solution and further in the fact that the aging process may be accelerated by the application of heat. The phenomenom is also shear dependent in the sense that the thickening action will be temporarily disrupted if the composition is subjected to excessive shearing action.

The sulfonate surfactant employed in carrying out the present invention may be of any suitable type that should be selected on the basis of producing the desired low interfacial tension between the reservoir water and the injected oil. Many sulfonate-type surfactants are known in the detergent art and have been proposed for use in waterflooding. Preferably an alkyl aryl sulfonate having an average molecular weight within the range of 350 to 500 will be employed in formulating the viscous aqueous liquids of the present invention. While the selection of a particular sulfonate is somewhat specific with regard to the reservoir oil-injection water system involved, normally the use of alkyl aryl sulfonates within this molecular weight range will lead to the desired low interfacial tension, normally 0.005 dyne/cm or less. The sulfonate molecular weights referred to herein are calculated as equivalent weights for the sodium form assuming 100 percent monosulfonation. Such alkyl aryl sulfonates may be the so-called synthetic sulfonates such as those derived from sulfonation of products such as keryl benzenes or they may be petroleum sulfonates derived from sulfonation of petroleum oils or petroleum oil fractions. Normally it will be preferred to employ petroleum sulfonates in the present invention since they are more economical than the synthetic sulfonates and since they usually provide a mixture of sulfonates having a fairly wide molecular weight distribution which is helpful in arriving at the desired low interfacial tension.

The sulfonate surfactant employed in formulating the viscous aqueous liquid is used in a concentration within the range of 0.5-4.0 weight percent and as explained hereinafter preferably in a concentration within the range of 0.5-3.0 weight percent. Commercially available petroleum sulfonates commonly are marketed as products containing about 50—80 percent active sulfonates with the remainder constituting impurities such as oil, water, and sodium sulfate and other inorganic salts. The sulfonate concentration as set forth herein are expressed in a weight percent active basis which exclude the impurities which may be contained in the commercial product.

The alcohol co-surfactant used in the present invention is a water-soluble $C_4$-$C_6$ aliphatic alcohol. Thus the co-surfactant may be selected from the group consisting of butyl, amyl, and hexyl alcohols. The alcohol has a hydrocarbon chain length of at least 3 carbon atoms. By the term "hydrocarbon chain length" is meant the chain length of the aliphatic portion of the molecule exclusive of the carbinol group. Thus n-butyl alcohol and isobutyl alcohol, for example, exhibit hydrocarbon chain lengths of 3 carbon atoms whereas secondary and tertiary butyl alcohols do not. Relative amounts of sulfonate surfactant and alcohol co-surfactant are expressed herein in terms of the ratio $\phi$ of the sulfonate surfactant to the sum of the sulfonate surfactant and the alcohol co-surfactant in accordance with the following relationship $$\phi = \frac{S}{S + C}$$

wherein:
S is the concentration of the sulfonate in weight percent, and
C is the concentration of the alcohol in weight percent.

As explained in greater detail hereinafter, the alcohol co-surfactant is employed in a concentration to provide a ratio $\phi$ within the range of 0.3-0.8.

In order to illustrate the thickening effect of the surfactant/co-surfactant mixtures employed in the present invention, laboratory experiments were carried out to determine the viscosities of mixtures of various $C_4$-$C_6$ aliphatic alcohols with the petroleum sulfonate. In each test the aqueous medium employed was a distilled water to which had been added mixed salts to provide a total mixed salt concentration of 1.4 weight percent. The mixed salt solution contained 0.6 weight percent sodium chloride, 0.6 weight percent sodium carbonate, and 0.2 weight percent sodium tripolyphosphate. The surfactant employed in these tests was a sodium petroleum sulfonate having an average molecular weight of about 420 and a molecular weight distribution of about 335 to 460 which is available from the Witco Chemical Company under the trade name TRS 10-80.

The results of the first suite of experiments employing TRS 10-80 in combination with isobutyl alcohol, n-butyl alcohol, n-pentanol, and n-hexanol are shown respectively in Tables I, II, III, and IV. In each of Tables I-IV, the surfactant and alcohol concentrations are given in the first and second columns, respectively, and the calculated ratio $\phi$ is set forth in the third column. The remaining columns present the system viscosities in centipoises after aging for the time indicated. In each case the surfactant-alcohol solutions were aged at room temperature, approximately 77° F., and the viscosity measurements were taken with a Brookfield viscometer at a nominal shear rate of 1.7 sec$^{-1}$. Certain of the data given in Tables I-IV are presented in FIGS. 1-4, respectively, in which the curves shown are graphs of the log of the viscosity, V, in centipoises plotted on the ordinate versus the previously described ratio $\phi$ on the abscissa.

Table I presents the viscosity measurements observed for the system of TRS 10-80 and isobutyl alcohol at varying alcohol concentrations and at sulfonate surfactant concentrations of 0.4 weight percent, 1.5 weight percent, 3.0 weight percent, and 4.0 weight percent. In FIG. 1A, the viscosities observed for the sulfonate surfactant concentrations of 0.4, 1.5, 3.0, and 4.0 weight percent are illustrated by curves $a$, $b$, $c$, and $d$, respectively. The corresponding viscosity measurements obtained after aging for 28 days are presented in FIG. 1B with curves $a'$, $b'$, $c'$, and $d'$ representing plots of the viscosity data at sulfonate concentrations of 0.4, 1.5, 3.0, 4.0 weight percent, respectively. From an examination of the data presented in Table I and FIGS. 1A and 1B, it can be seen that a modest thickening effect was observed for the relatively low sulfonate concentrations of 0.4 weight percent. The observed thickening effect becomes quite significant when the sulfonate surfactant concentration reaches 1.5 weight percent and continues to increase as the sulfonate concentration increases. The value of $\phi$ at which the maximum viscosity occurs also appears to increase as the surfactant concentration increases from 1.5 to 4.0 weight percent. At the intermediate sulfonate concentrations of 1.5 and 3.0 weight percent, the maximum viscosity observed after aging for one day appears generally to fall within the range of $\phi$ of about 0.3 to 0.5. With aging, the maximum viscosity range is broadened somewhat and occurs generally for values of $\phi$ within the range of about 0.3 to 0.6 at these intermediate surfactant concentrations. At the higher surfactant concentration of 4.0 weight percent, relatively high viscosities are observed at $\phi$ values within the range of about 0.5-0.7 for aging for 1 day and at $\phi$ values of about 0.5-0.8 after aging for 28 days.

TABLE I

| % Surfactant | % Alcohol | $\phi$ | Viscosity 1 day | 28 days |
|---|---|---|---|---|
| 0.4 | 0.6 | 0.4 | 2. | 2.8 |
|  | 0.3 | 0.571 | 3. | 3.2 |
|  | 0.15 | 0.727 | 2. | 3.2 |
|  | 0.075 | 0.842 | 2. | 4. |
| 1.5 | 4.0 | 0.272 | 9. | 8. |
|  | 3.0 | 0.33 | 13. | 32. |

TABLE I-continued

| % Surfactant | % Alcohol | φ | Viscosity 1 day | 28 days |
|---|---|---|---|---|
| | 2.25 | 0.4 | 6. | 12. |
| | 1.125 | 0.571 | 3. | 6. |
| | 0.563 | 0.727 | 3. | 4. |
| | 0.281 | 0.842 | 2. | 6. |
| 3.0 | 6.0 | 0.33 | 3. | 6. |
| | 4.5 | 0.4 | 43. | 44. |
| | 2.25 | 0.571 | 20. | 96. |
| | 1.126 | 0.727 | 6. | 44. |
| | 0.562 | 0.842 | 3. | 12. |
| 4.0 | 6. | 0.4 | 11. | 6. |
| | 4.0 | 0.50 | 64. | 40. |
| | 3. | 0.571 | 113. | 144. |
| | 2.5 | 0.64 | 240. | 380. |
| | 1.5 | 0.727 | 13. | 160. |
| | 0.75 | 0.842 | | 40. |

Figure 2A:
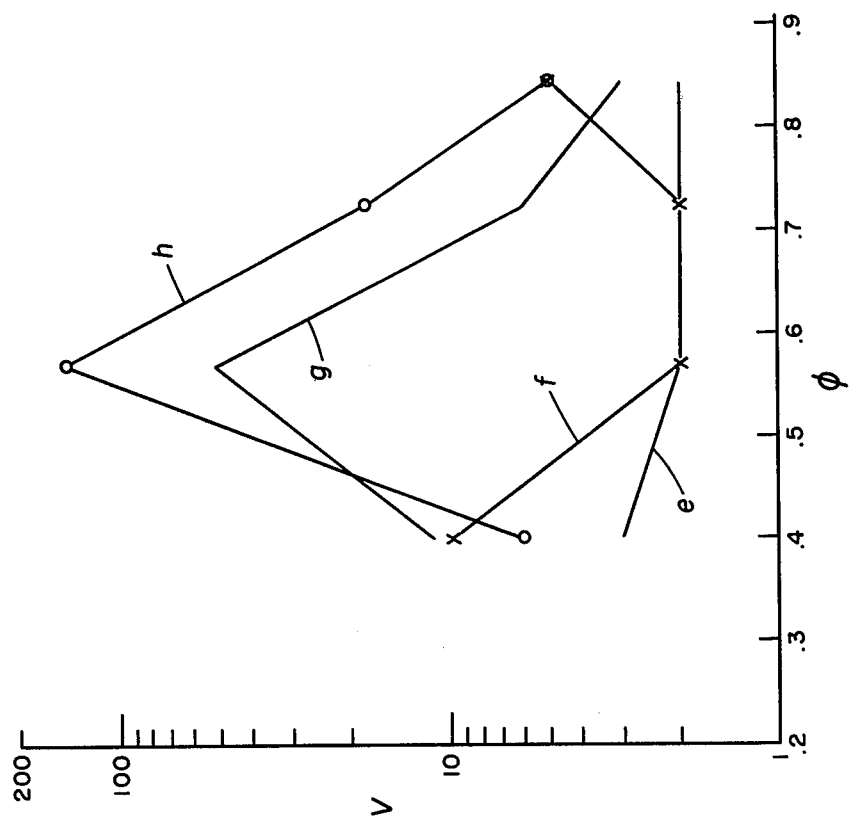

Table II shows the results of a similar set of experiments carried out employing n-butyl alcohol with viscosity measurements obtained after aging for 1, 4, and 18 days. The viscosity data presented in the fourth and sixth columns of Table II are presented in FIGS. 2A and 2B. In FIG. 2A, the curves e, f, g, and h are plots of the viscosity data obtained after 1 day for sulfonate concentrations of 0.4, 1.5, 3.0, and 4.0 weight percent, respectively. The same data obtained at 18 days are presented in FIG. 2B by curves e', f', g', and h'. The data presented in Table II and FIGS. 2A and 2B conform generally to that shown for the surfactant-isobutyl alcohol system. However, as can be seen from a comparison of FIGS. 1 and 2, the n-butyl alcohol surfactant system shows a somewhat better thickening effect with age at the sulfonate surfactant concentration of 1.5 weight percent. The maximum viscosities measured are found to occur at about the same values of φ as the isobutyl alcohol -surfactant systems.

TABLE II

| % Surfactant | % Alcohol | φ | Viscosity 1 day | 4 days | 18 days |
|---|---|---|---|---|---|
| 0.4 | 0.6 | 0.4 | 3. | 2. | 3.2 |
| | 0.3 | 0.571 | 2. | 2. | 2.8 |
| | 0.15 | 0.727 | 2. | 2. | 2.4 |
| | 0.075 | 0.842 | 2. | 2. | 2.8 |
| 1.5 | 2.25 | 0.4 | 10. | 22. | 42. |
| | 1.125 | 0.571 | 2. | 3.2 | 5.2 |
| | 0.563 | 0.727 | 2. | 2.8 | 4. |
| | 0.281 | 0.842 | 5. | 2.8 | 2.4 |
| 3.0 | 4.6 | 0.4 | 11. | 8.8 | 10. |
| | 2.25 | 0.571 | 51. | 80. | 94. |
| | 1.126 | 0.727 | 6. | 9.6 | 32. |
| | 0.562 | 0.842 | 3. | 3.2 | 5.2 |
| 4.0 | 6. | 0.4 | 6. | 6. | 6. |
| | 3. | 0.571 | 144. | 144. | 160. |
| | 1.5 | 0.727 | 18. | 54. | 170. |
| | 0.75 | 0.842 | 5. | 6. | 19.2 |

Figure 3A:
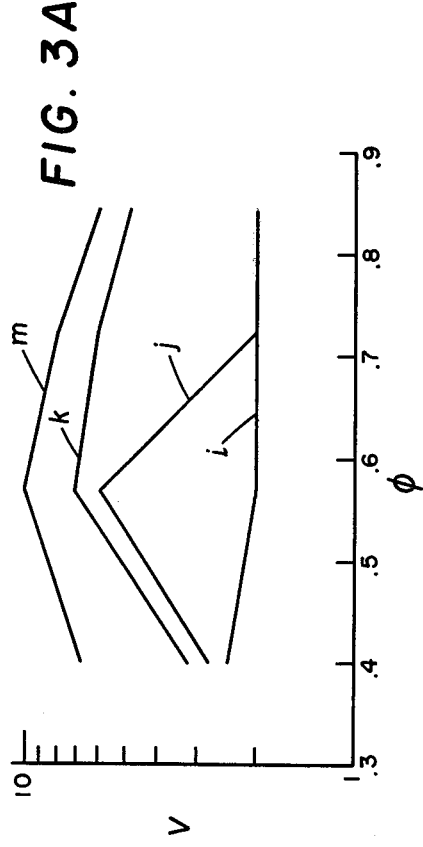
FIGS. 3A and 3B are graphs illustrating the relationship between viscosity and relative surfactant and alcohol concentrations for systems in which the alcohol component is n-pentanol.
Figure 3B:
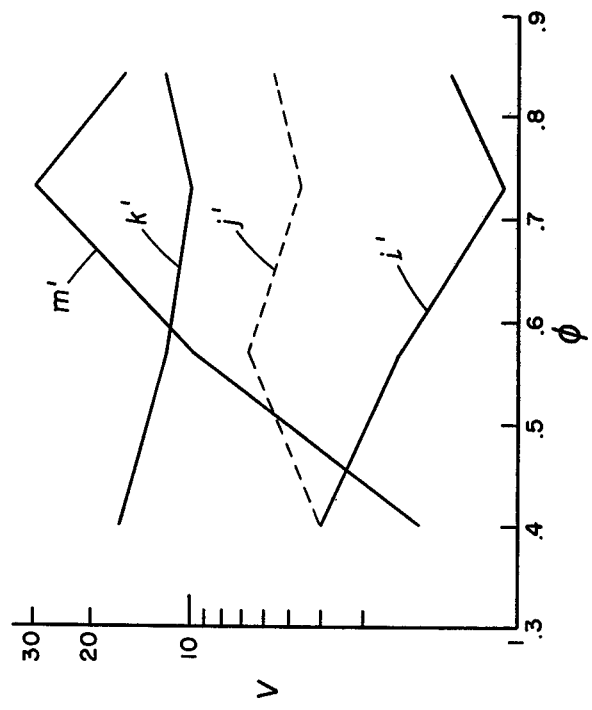

Table III and FIGS. 3A and 3B illustrate the results of viscosity tests carried out with an n-pentyl alcohol TRS 10-80 system. In FIG. 3A, curves i, j, k, and m show the viscosities measured at surfactant concentrations of 0.4, 1.5, 3.0, and 4.0 weight percent, respectively, after aging for 6 days. In FIG. 3B, curves i', j', K', and m' illustrate the viscosity measurements obtained for the same systems after aging for 56 days. From an examination of Table III and FIGS. 3A and 3B, it can be seen that the aging effect observed in the previously discussed system is present in the surfactant-pentyl alcohol system also. However, the maximum viscosities measured were generally lower than for the butyl alcohol systems and also seem to occur upon aging at somewhat higher values of the ratio φ for the intermediate surfactant concentrations at 1.5 and 3.0 weight percent. Generally the maximum viscosities seem to occur at φ values of about 0.5 to 0.8. At the higher surfactant concentration of 4.0 weight percent, the maximum thickening effect on aging occurs at a value of φ of 0.4 although the viscosity remains fairly even throughout the range of 0.4–0.8.

TABLE III

| % Surfactant | % Alcohol | φ | Viscosity 6 days | 56 days |
|---|---|---|---|---|
| 0.4 | 0.6 | 0.4 | 2.4 | 4. |
| | 0.3 | 0.571 | 2. | 2.4 |
| | 0.15 | 0.727 | 2. | 1.2 |
| | 0.075 | 0.842 | 2. | 1.6 |
| 1.5 | 2.25 | 0.4 | 2.8 | 4. |
| | 1.12 | 0.571 | 6. | 6.8 |
| | 0.563 | 0.727 | 2. | 4.8 |
| | 0.281 | 0.842 | 2. | 5.6 |
| 3.0 | 4.5 | 0.4 | 3.2 | 2. |
| | 2.25 | 0.571 | 7.2 | 10. |
| | 1.126 | 0.727 | 6. | 30. |
| | 0.562 | 0.842 | 4.8 | 16. |
| 4.0 | 6.0 | 0.4 | 6.8 | 16.8 |
| | 3.0 | 0.571 | 10.0 | 12.0 |
| | 1.5 | 0.727 | 8.0 | 10.0 |
| | 0.75 | 0.842 | 6.0 | 12.0 |

Figure 4:
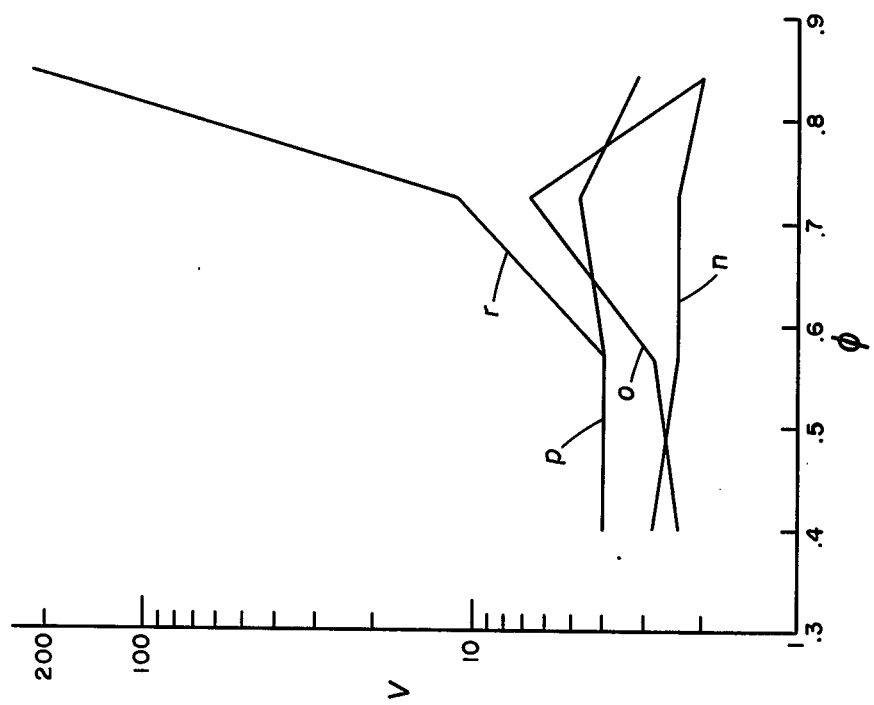
FIG. 4 is a graph illustrating the relationship between viscosity and relative surfactant and alcohol concentrations for systems in which the alcohol component is n-hexanol.

The results of experiments carried out for the system TRS 10-80 and n-hexanol are set forth in Table IV and are illustrated in FIG. 4 in which curves n, o, p, and r are plots of the viscosity measured for day old systems containing 0.4, 1.5, 3.0, and 4.0 weight percent sulfonate, respectively. An examination of the viscosity values measured after aging for 1 day shows that they conform generally to the 6-day viscosities observed for the pentyl alcohol system for surfactant concentrations of 0.4, 1.5, and 3.0 weight percent. However, at the higher surfactant concentration of 4.0 weight percent, a dramatic increase in viscosity was observed as the n-hexanol concentration was decreased to provide values of φ upwards of about 0.7. As indicated in Table IV, the only further aging studies carried out for n-hexanol system were at a surfactant concentration of 1.5 weight percent where viscosity measurements were taken after aging for 78 days. This data indicates a very little, and probably not significant, decrease in viscosity after the further aging.

TABLE IV

| % Surfactant | % Alcohol | φ | Viscosity 1 day | 78 days |
|---|---|---|---|---|
| 0.4 | 0.6 | 0.4 | 2.8 | |
| | 0.3 | 0.571 | 2.4 | |
| | 0.15 | 0.727 | 2.4 | |
| | 0.075 | 0.842 | 2. | |
| 1.5 | 2.25 | 0.4 | 2.4 | 2. |
| | 1.125 | 0.571 | 2.8 | 2. |
| | 0.563 | 0.727 | 6.8 | 6. |
| | 0.281 | 0.842 | 2. | 2. |
| 3.0 | 4.5 | 0.4 | 4.0 | |
| | 2.25 | 0.571 | 4.0 | |
| | 1.126 | 0.727 | 4.8 | |
| | 0.562 | 0.842 | 3.2 | |
| 4.0 | 6 | 0.4 | 4.0 | |
| | 3 | 0.571 | 4.0 | |
| | 1.5 | 0.727 | 11.2 | |
| | 0.75 | 0.842 | 220. | |

As noted previously, the thickened aqueous solution of surfactant and alcohol co-surfactant employed in the present invention exhibits a monovalent salt salinity within the range of 0.5–3.0 weight percent and preferably within the range of 0.8–2.5 weight percent. The monovalent salt salinity of the aqueous medium usually will be controlled by sodium chloride since this salt is inexpensive and normally is readily obtainable. However, salinity control can be accomplished by other monovalent salts particularly other alkali metal halides such as potassium chloride. Thus by the terms "monovalent salt salinity" and "salinity", unless otherwise qualified, as used herein and in the appended claims are means the dissolved monovalent salt content of the aqueous liquid expressed in weight percent. The monovalent salt salinity of the aqueous solution is significant not only from the standpoint of achieving low interfacial tension, as observed for example in the aforementioned papers by Foster and Gilliland et al., but also in regard to the thickening phenomena exhibited by the surfactant/co-surfactant systems.

To demonstrate the relationship between monovalent salt salinity and viscosity, laboratory experiments were carried out with various surfactant/co-surfactant systems with the monovalent salt salinity of the liquid and the age at which viscosity measurements taken as independent variables. In each of these series of tests, isobutyl alcohol was employed as the co-surfactant. The sulfonate surfactants employed were TRS 10-80, identified previously, Synacto 426, FA 400, and Stepan 107. Stepan 107 is a sodium petroleum sulfonate available from Stepan Chemical Co. While the product has not been further characterized, it is thought to have a somewhat lower average molecular weight than previously described TRS 10-80 and to have a somewhat broader molecular weight distribution. FA 400 is a synthetic monoethanolamine alkyl aryl sulfonate available from Exxon Chemical Co. Synacto 426 is a synthetic sodium alkyl aryl sulfonate available from Exxon Chemical Co. In each case, the salinity was adjusted to the desired level by adding sodium chloride to distilled water. Aging was carried out at room temperature, approximately 77° F., and the viscosity measurements were taken with a Brookfield viscometer at a nominal shear rate of 1.7 sec $^{-1}$. In each of FIGS. 5-8, the various curves shown are plots of the log of viscosity, V, in centipoises on the ordinate versus the log of the sodium chloride concentration, C, in weight percent on the abscissa.

Figure 5:
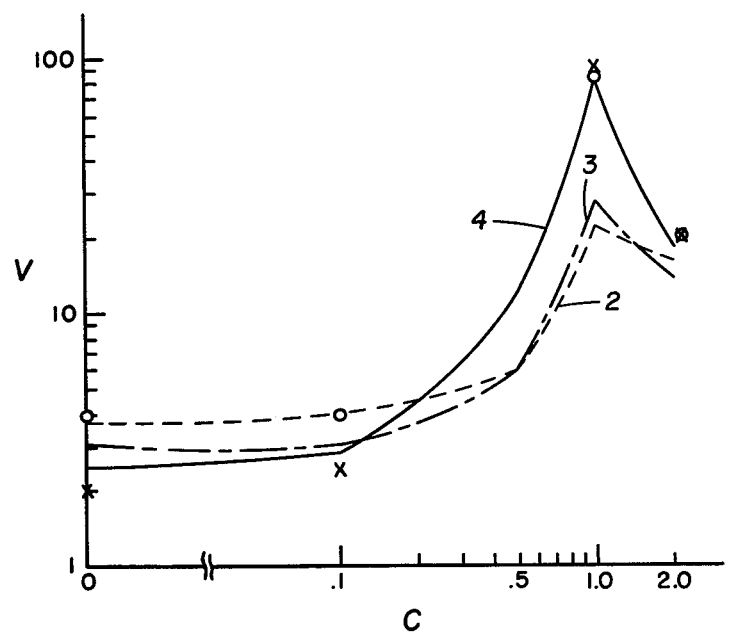
FIGS. 5 through 8 are graphs illustrating the relationship between viscosity and salinity for systems comprising isobutyl alcohol and different commercially available sulfonate surfactants.

Turning now to FIG. 5, curves 2, 3, and 4 show viscosity measurements obtained at aging times of 0.8, 1.9, and 10 days, respectively, for the system comprising 3.0 weight percent TRS 10-80 and 3.0 weight percent isobutyl alcohol. In addition, data points indicated by the legend O show viscosity measurements taken after aging for 23 days and data points indicated by the legend X show the viscosity measurements taken after aging for 46 days. An examination of the data presented in FIG. 5 shows that significantly elevated viscosities occur within the range of 0.5-2.5 weight percent sodium chloride with the maximum viscosity in each case occurring at 1.0 weight percent sodium chloride.

Figure 6:
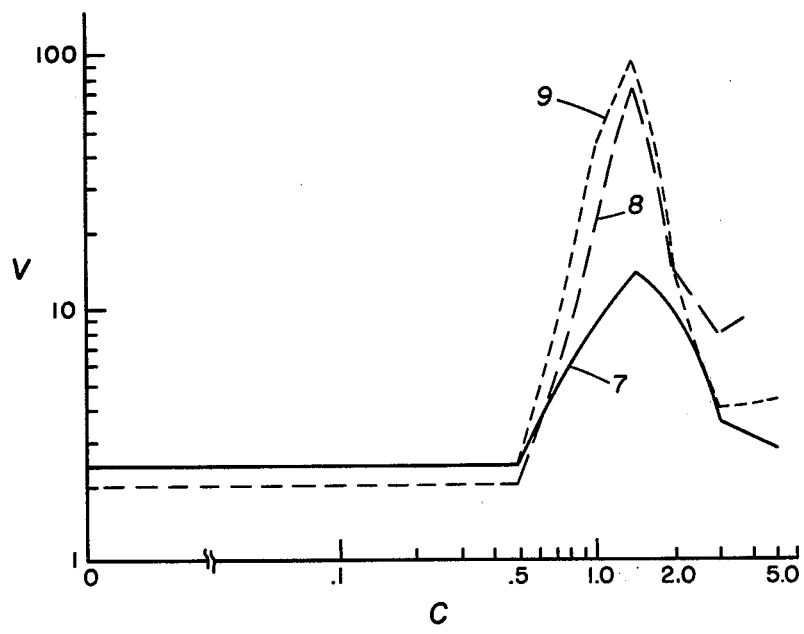

In FIG. 6, curves 7, 8, and 9 are plots of viscosity measurements taken respectively at 1, 4, and 15 days, respectively, for the system comprising Synacto 426 and isobutyl alcohol. The surfactant was present in the concentration of 1.5 weight percent and the alcohol in a concentration of 2.25 weight percent to provide a $\phi$value of 0.4. Curves 7, 8, and 9 indicate that significant viscosity yields occur at salinities within the range of 0.8-2.5 with the maximum viscosity occurring in each case at a salinity of 1.4.

Figure 7:
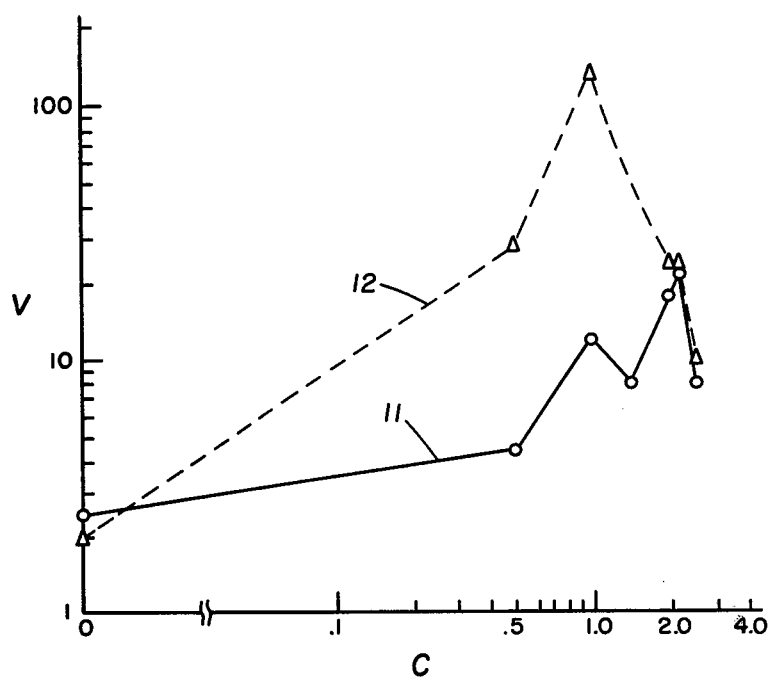

Turning now to FIG. 7, curves 11 and 12 indicate, respectively, viscosity measurements obtained after aging for 1 day and 6 days. The system employed in these tests comprised 3.0 weight percent FA 400 and 2.25 weight percent isobutyl alcohol to provide a ratio $\phi$ of 0.571. The viscosity measurements were taken at 77° F. An examination of curve 11 reveals that no appreciable increase in viscosity was observed until the salinity reached about 1.0 weight percent. However, curve 12 indicates that after aging for 6 days the viscosity of the 0.5 weight percent sodium chloride solution rose to a value of about 28 centipoises. The viscosity reached a maximum value of about 130 centipoises at a salinity of 1.0 weight percent and thereafter declined.

Figure 8:
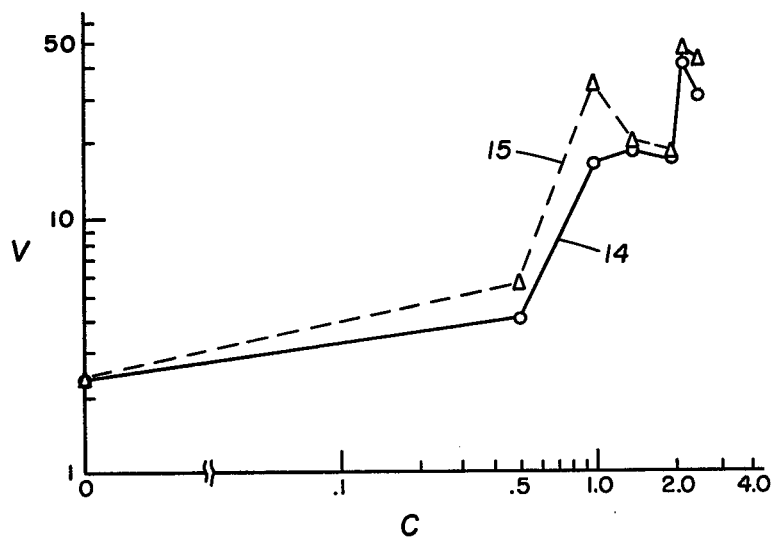

In FIG. 8, viscosities measured after 1 day and 6 days are shown by curves 14 and 15, respectively, for the system comprising 3.0 weight percent Stepan 107 and 2.25 weight percent isobutyl alcohol to provide a ratio $\phi$ of 0.571. In this system, the aging effect while still present does not appear to be as pronounced as in the systems previously discussed. It will be noted that both curves 14 and 15 exhibit a double maxima with maximum values of the 6-day age system occurring at salinities of 1.0 and about 2.4 weight percent. An extrapolation of both curves 14 and 15 would indicate that significantly high viscosities may be expected at salinities as high as 3.0 weight percent.

Figure 9:
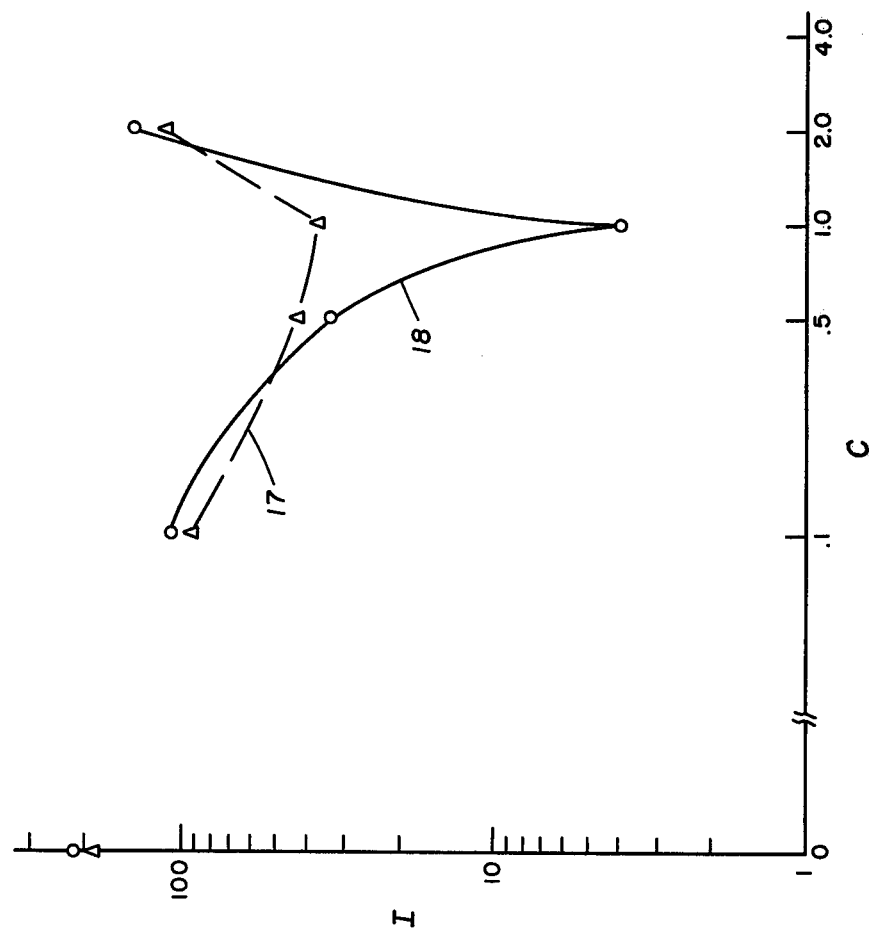
FIG. 9 is a graph illustrating the relationship between oil-water interfacial tension and salinity for systems comprising isobutyl alcohol and different concentrations of sulfonate surfactant.

While sulfonate concentrations as high as 4.0 weight percent can be employed in the present invention, in most cases it will be preferred to limit sulfonate concentration to a maximum of 3.0 weight percent. This is desirable not only to avoid the use of excessive sulfonate with the attendant expense but also from the viewpoint of the interfacial tension between the reservoir oil and the injected water. In this regard, FIG. 9 presents data showing the relationship between the oil water interfacial tension and salinity and sulfonate concentration. In FIG. 9, curve 17 is a plot of the log of oil/water interfacial tension I in millidynes per centimeter on the ordinate versus the log of the sodium chloride concentration, C. in weight percent on the abscissa for a system comprising 4.0 weight percent TRS 10-80 and 3.0 weight percent isobutyl alcohol ($\phi$ = 0.571) and curve 18 is a similar plot of the system comprising 3.0 weight percent TRS 10-80 and 3.0 weight percent isobutyl alcohol to provide a $\phi$ value of 0.5.

From an examination of the data presented in FIG. 9 it can be seen that surfactant/co-surfactant systems employing the relatively low concentrations of petroleum sulfonates are more effective in producing the desired low interfacial tensions and in providing a relatively wide salinity window within which these low tensions are achieved. Thus it is preferred in carrying out the present invention to employ where possible relatively low sulfonate concentrations within the range of 1.0-2.0 weight percent. It will be recalled from the data presented in FIGS. 1-4 that the systems comprising the isobutyl alcohol and n-butyl alcohol are more effective thickening agents at these low surfactant concentrations than are systems comprising the pentyl and hexyl alcohols. Thus it will be preferred when employing these relatively low sulfonate concentrations to employ the butyl alcohols as the co-surfactant. While both are effective, the n-butyl alcohol appears to give somewhat higher viscosities than the isobutyl alcohol.

Figure 10:
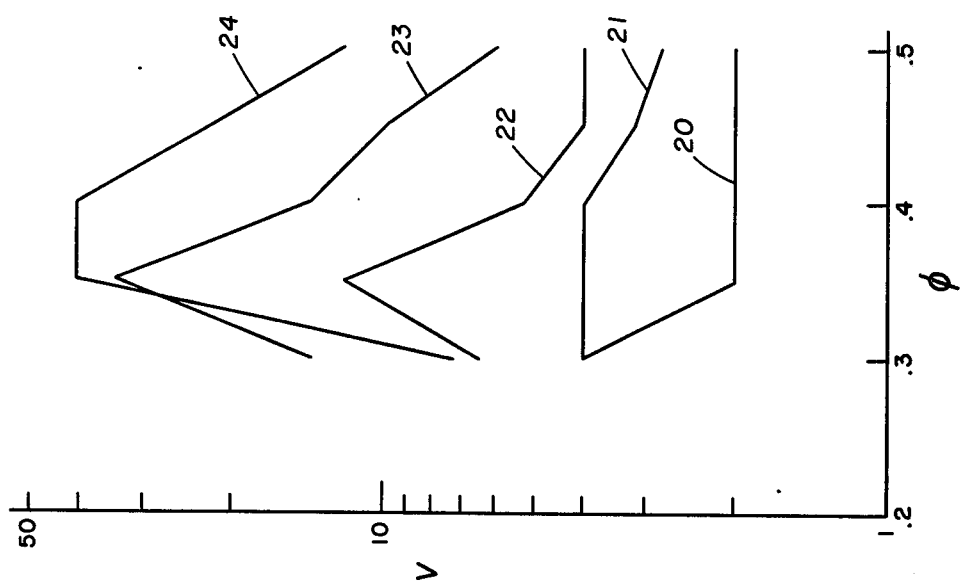
FIG. 10 is a graph illustrating the relationship between viscosity and relative surfactant and alcohol concentrations for systems comprising n-butyl alcohol.

Table V presents the results of a compositional study carried out for systems comprising TRS 10-80 and n-butyl alcohol at sulfonate concentrations ranging from 0.5-1.5 weight percent. The n-butyl alcohol concentration was adjusted to provide values of $\phi$ of 0.3, 0.35, 0.4, 0.45, and 0.50. The aqueous medium employed was the 1.4 mixed salt solution identified previously. The viscosity measurements were taken in the manner described previously at a nominal shear rate of 1.7 sec$^{-1}$ after aging the systems for 1, 14, and 26 days. The viscosity data shown in Table V obtained after aging for 26 days is shown in FIG. 10 with the log of the viscosity in centipoises plotted on the ordinate versus the value of $\phi$ plotted on the abscissa. In FIG. 10, curves 20, 21, 22, 23, and 24 are plots of viscosity data obtained at sulfonate concentrations of 0.5, 0.75, 1.0, 1.25, and 1.5 weight percent, respectively. From an examination of these curves it can be seen that the viscosity maxima occur at values of $\phi$ within the range of 0.3–0.5 and it is preferred to operate within this range when employing n-butyl alcohol in a system comprising 1.0–2.0 weight percent petroleum sulfonate.

percent of the commercial product TRS 10-80 and 1.375 weight percent of n-butyl alcohol to provide a $\phi$ value of 0.522. The commercial TRS 10-80 contained slightly less than 9% oil as an impurity, thus providing an oil content in the aqueous solution of surfactant and alcohol of 0.13 weight percent.

The system represented by curve 27 of FIG. 11 was identical in all respects to that represented by curve 26 except that the commercial TRS 10-80 was "de-oiled" by hexane extraction process to remove the hydrocarbon impurity. The de-oiling procedure involved dissolving the petroleum sulfonate in a mixture of equal parts of water and isopropyl alcohol and then extracting the sulfonate solution several times with hexane until

TABLE V

| % Surfactant | $\phi$=0.30 | | | $\phi$=0.35 | | | $\phi$=0.40 | | | $\phi$=0.45 | | | $\phi$=0.50 | | |
|---|---|---|---|---|---|---|---|---|---|---|---|---|---|---|---|
| | 1 day | 14 days | 26 days | 1 day | 14 days | 26 days | 1 day | 14 days | 26 days | 1 day | 14 days | 26 days | 1 day | 14 days | 26 days |
| 1.5 | 4.8 | 9.4 | 7.2 | 20. | 44. | 40. | 16. | 40. | 40. | 3.2 | 2. | | 2.4 | 5. | 12. |
| 1.375 | 12. | 15. | 16. | 14. | 38. | 40. | 3.2 | 18. | 32. | 4. | 12. | | 2.4 | 7. | |
| 1.25 | 12. | 9. | 14. | 4.4 | 19. | 34. | 3.2 | 9. | 14. | 2.4 | 7. | 10. | 2. | 3. | 6. |
| 1.0 | 2. | 2. | 6.4 | 2.8 | 7. | 12. | 2. | 3. | 5.2 | 2. | 5. | 4. | 2. | 8. | 4. |
| 0.75 | 2.4 | 4. | 4.0 | 2. | 3. | 4.0 | 2. | 3. | 4.0 | 2. | 3. | 3.2 | 2. | 3. | 2.8 |
| 0.50 | 2. | 2. | 4.0 | 1.6 | 2. | 2.0 | 1.6 | 2.4 | 2.0 | 1.6 | 3. | | 1.6 | 2. | 2.0 |

From the foregoing description, it will be recognized that the sulfonate-alcohol systems employed in the present invention differ in several significant respects from the systems employed in microemulsion flooding. The microemulsion systems function to displace oil by means of a miscible displacement process and appear to have certain compositional requirements in order to achieve miscibility between the microemulsion slug and the displaced reservoir oil. For example, the aforementioned U.S. Pat. No. 3,506,071 to Jones sets a lower limit for the sulfonate surfactant of 4% and states that hydrocarbon should be present in the microemulsion in an amount within the range of 1 to 50%. The previously mentioned SPE Paper 5566 by Jones and Dreher presents a number of micellar slug compositions containing from 10 to 12% sulfonate and from 22.8 to 63.1% added hydrocarbon.

In contrast with micellar systems of the type disclosed in the Jones and Dreher article and the Jones patent, the surfactant-alcohol systems employed in the present invention do not require high concentrations of sulfonate surfactant and perhaps more significantly they do not require that oil be present in the system. On the contrary, while the presence of oil can be tolerated it is preferred that the systems be substantially free of oil or contain only such oil, normally less than 0.8 weight percent, which may be added as an impurity in the sulfonate surfactant. In fact, where a petroleum sulfonate is employed as the sulfonate surfactant, the commercial product may be treated to remove the oil normally present as an impurity prior to adding the petroleum sulfonate to the aqueous medium. In this case, the aqueous solution of surfactant and alcohol as injected will be substantially free of oil.

FIG. 11 presents experimental data showing the relationship between viscosity and salinity for two sulfonate-alcohol systems which were identical with the exception that one contained oil which was present in the commercial petroleum sulfonate as an impurity whereas the other was substantially free of oil. In FIG. 11, curves 26 and 27 are log-log plots of the viscosity, V, in centipoises on the ordinate versus the sodium chloride concentration, C, in weight percent on the abscissa. The system represented by curve 26 contained 1.5 weight the separate hexane layer was clear, indicating that all of the oil had been removed. The hexane fraction was preserved and back-extracted with a solution of equal parts of isopropanol and water to recover any petroleum sulfonate in the hexane and the total isopropanol-water sulfonate solution was evaporated to near dryness in a steam bath and then dried in a vacuum oven at 80° C.

From an examination of curves 26 and 27 of FIG. 11, it can be seen that it is not necessary to employ oil in order to attain increased viscosities employing the surfactant-alcohol systems of the present invention. In fact, a comparison of curves 26 and 27 would indicate that increased viscosities can be attained at least in the salinity range of 0.8–2.5 weight percent sodium chloride by maintaining the system free of oil.

In a further aspect of the invention, the viscosity of the aqueous solution of sulfonate and alcohol may be varied spatially by varying the salinity, the sulfonate surfactant concentration, or the alcohol concentration. Viscosity gradation itself in mobility control applications is well known in the art. For example, the aforementioned paper by Foster discloses grading the viscosity of a mobility control slug from a maximum viscosity at the interface with the previously injected low tension slug to a terminal viscosity near that of the subsequently injected driving fluid. Another procedure disclosed in application Ser. No. 522,081, filed Nov. 7, 1974 by H. L. Chang, involves grading both the leading and trailing edges of a mobility control slug between the viscosity of water and a maximum viscosity at least as great as the viscosity of the reservoir oil. In the present invention, viscosity grading may be accomplished by adjusting any one or more of the abovedescribed parameters which affect the viscosity of the aqueous solution of the surfactant-alcohol system. For example, with respect to salinity and recalling the data presented in FIGS. 5 through 8 and the attendant text, it will be recognized that viscosity gradation in the rear portion of the slug can be accomplished by varying the salinity either upwardly or downwardly from the salt concentration at which the maximum viscosity is obtained. Usually it will be preferred to attain the decreasing viscosity gradation by decreasing the salinity since this is consistent with chromatographic transportation of the surfactant through the reservoir.

Viscosity gradation in the rear portion of the slug can also be accomplished by decreasing the aliphatic alcohol concentration in order to provide an increase in the ratio $\phi$. As can be seen from an examination of FIGS. 1-4 and 10, this technique of controlling viscosity by adjusting the ratio $\phi$ is most effective at the low to intermediate sulfonate concentrations of about 0.5-3.0 weight percent. Viscosity gradation can also be accomplished by decreasing both the sulfonate and alcohol concentrations. In this aspect of the invention, the sulfonate and alcohol concentrations may be decreased incrementally by the same relative amounts (in which case the ratio $\phi$ would remain the same) or by different relative amounts in order to provide an adjustment in the ratio $\phi$ as well as an adjustment in the total system concentration.

Viscosity gradation in the front portion of the mobility control slug can be accomplished by adjusting one or more of the above-described parameters in a manner to provide for a progressively increasing viscosity. A preferred technique for viscosity gradation in the frontal portion of the slug is to increase the concentration of aliphatic alcohol in a manner to provide a decrease in the ratio $\phi$. This not only accomplishes the desired viscosity gradation but is also consistent with the preferred embodiment of the invention described hereinafter which involves the sequential injection of a surfactant slug followed by a surfactant-alcohol slug of increased viscosity for mobility control purposes. It will also be recognized that viscosity gradation can be achieved by varying several of the above-described parameters in combination, e.g. the viscosity of the rear portion of the slug can be decreased by decreasing both the monovalent salt salinity and the alcohol concentration.

As recognized by those skilled in the art, sulfonate surfactants such as petroleum sulfonates or synthetic alkyl aryl sulfonates proposed for use in chemical waterflooding are subject to adsorption onto the reservoir rock surfaces. The sulfonate surfactant thus moves through the reservoir by chromatographic adsorption-desorption process in which the adsorbing sulfonate moves at a rate lower than that of the aqueous liquid in which it is dissolved. In contrast, the alcohol component employed in the present invention is substantially non-adsorbing or, if it adsorbs, does so at a significantly lower rate than the sulfonate surfactant. Thus the alcohol tends to move through the reservoir at a rate greater than the sulfonate surfactant.

In a preferred embodiment of the invention, this differential transport rate between the alcohol and the sulfonate surfactant is compensated for by injecting a surfactant slug ahead of a mobility control slug containing both surfactant and alcohol. The mobility control slug contains surfactant, alcohol. and monovalent salt within the concentrations described previously to provide an increased viscosity greater than the viscosity of the surfactant slug. The surfactant slug has a sulfonate concentration and a monovalent salt salinity providing the desired low oil/water interfacial tension which will tend to initially mobilize the reservoir oil to form an oil bank at the flood front. The surfactant slug preferably is at least initially free of alcohol in order to allow the initial banking of oil before the alcohol, because of its greater transport rate, "catches up" with the surfactant to provide the viscosity enhancing effect. If alcohol is present in the surfactant slug, it should be in a relatively low concentration so that the surfactant slug exhibits a lower viscosity than the mobility control slug. For example, where viscosity gradation of the type disclosed in the aforementioned application by Chang is employed, the alcohol concentration may be progressively increased such that there is no sharp delineation between the surfactant slug and the mobility control slug.

As noted previously, the thickening effect observed for the surfactant-alcohol systems employed in accordance with the present invention increases with time. In general for systems maintained at room temperature, little or not thickening effect is observed for the first several hours following addition of the sulfonate and alcohol components to the aqueous medium. However, after aging of room temperature for a period of about 1 day, a significant thickening effect begins to appear which continues to increase with age for a period of days and usually for a period of weeks before a maximum or near maximum viscosity is reached. Thus, in a further aspect of the present invention, the aqueous solution of surfactant and alcohol is formulated to provide the desired surfactant, alcohol, and salt concentrations and then aged for a period of time to allow for viscosity development before injecting the fluid into the subterranean oil reservoir. Desirably, where the aqueous sulfonate-alcohol system is at ambient temperature, it is aged for a period of at least one day prior to injection.

A preferred aging technique involves aging the aqueous solution of alcohol and sulfonate surfactant at an elevated temperature in order to accelerate viscosity development. In this regard, the effect of applied heat on the aging process is illustrated by the following experimental data. In each case the viscosity measurements were taken at a nominal shear rate of 1.7 sec$^{-1}$. In one set of experiments, 1.5 weight percent TRS 10-80 and 2.25 weight percent n-butyl alcohol were dissolved in a 1.4 weight percent mixed salt solution containing 1.0 weight percent sodium chloride, 0.2 weight percent sodium carbonate, and 0.2 weight percent sodium tripolyphosphate. For samples of this system aged at room temperature, the viscosity observed at the end of 1 day was 4 centipoises and at the end of 2 days was 6 centipoises. Samples of the identical system were then aged at an elevated temperature of 150° F. for prescribed periods and thereafter cooled gradually to room temperature over a period of 16 hours before viscosity measurements were taken. For the sample aged for 1 day at 150° F., in accordance with this procedure, the measured viscosity was 38 centipoises and for the sample aged for 2 days, under this procedure, the observed viscosity was 34.8 centipoises. A second suite of experiments was carried out for the same alcohol and surfactant concentrations as described above and under the identical conditions, except that in this case the 1.4 mixed salt solution contained 0.6 weight percent sodium chloride, 0.6 weight percent sodium carbonate, and 0.2 weight percent sodium tripolyphosphate. In this set of experiments, aging at room temperature produced a viscosity of 4.8 centipoises at the end of 1 day and 7.2 centipoises at the end of 2 days. Upon aging at 150° F. and then cooling as described previously, the sample aged at the elevated temperature for a period of 1 day exhibited a viscosity of 34.4 centipoises and the sample aged at this elevated temperature for 2 days had a viscosity of 34.8 centipoises.

Additional experiments were carried out in order to explore the effect of applied heat on the viscosity development of samples which had been subjected to extremely high shear rates. All viscosity measurements were carried out at a nominal shear rate of 1.7 sec$^{-1}$. One system comprised 1.5 weight TRS 10-80 and 1.0 weight percent n-butyl alcohol in a 1.2 weight percent mixed salt solution containing 0.8 percent sodium chloride, 0.2 percent sodium carbonate, and 0.2 percent sodium tripolyphosphate. This system exhibited a viscosity at 1.7 sec$^{-1}$ of 22 centipoises. The system was then sheared by flowing through a bead pack at a pore velocity of 183 feet per day to provide shear rates on the order of several hundred reciprocal seconds. The system, immediately after shearing, exhibited a viscosity of 18 centipoises and upon aging at room temperature (approximately 74° F.) had a viscosity of 8, 24, 48, and 72 hours of 15.2, 14.0, 11.2, and 9.6 centipoises, respectively. Two other aliquots of the sheared system were heat-aged for 24 hours and then cooled gradually to room temperature over a period of 16 hours as described previously. In one case, heat aging was carried out at 90° F. and in the other case at 150° F. The sample aged at 90° F. exhibited a viscosity of 17.6 centipoises and the sample aged at 150° F. had a viscosity of 21.2 centipoises.

A similar set of experiments was carried out for a system comprising 1.5 weight percent TRS 10-80 and 1.83 weight percent n-butyl alcohol in the 1.2 weight percent mixed salt solution described above. This system was found to have an unsheared viscosity of 36 centipoises. It was then subjected to high shear rates by flowing through a bead pack as described previously and aliquots were aged at room temperature and also at 90° and 150° F. using the heat-cool cycle described above. In this case, the system exhibited a viscosity at time zero (immediately after shearing) of 8 centipoises. Upon aging at room temperature the viscosity at 8 hours, 24 hours, 48 hours, and 72 hours was found to be 10, 15.2, 12, and 9.6 centipoises. The sample aged at 90° F. had a viscosity of 22 centipoises and the sample aged at 150° F. had a viscosity of 30 centipoises.

From the foregoing data it can be seen that by heat-curing the sulfonate-alcohol system the aging process can be accelerated appreciably — thus allowing the systems employed in the present invention to develop the desired viscosity without an unduly long holding period. This, of course, is particularly advantageous in view of the large quantities of fluid which normally will be injected in field applications of the invention. As indicated by the experimental data just described, the sulfonate-alcohol systems can be aged at temperatures within the range of 90°-150° F. to accelerate viscosity development.

Table VI illustrates the results of certain comparative oil displacement experiments carried out in the laboratory. The displacement experiments were performed in 3 foot long flow tubes having an inside diameter of ¼ inch and packed with crushed unconsolidated reservoir sand. For each displacement experiment, the tube, after packing with sand, was then saturated with an aqueous solution of 6 weight percent sodium chloride with the amount of sodium chloride solution necessary to saturate the tube being measured to determine the total pore volume of the tube. In each case a reservoir oil having a viscosity at room temperature of 7 centipoises then was flooded into the tube until the effluent from the tube contained no water. The total amount of water displaced from the tube during this operation was measured in order to determine the initial oil saturation. A waterflood then was simulated by injecting an aqueous 1.2 weight percent mixed salt solution containing 0.8 percent sodium chloride, 0.2 percent sodium carbonate, and 0.2 percent sodium tripolyphosphate. The amount of oil displaced from the tube during this procedure was measured in order to determine the waterflood residual oil saturation upon which the percent oil recoveries were based. Thereafter the displacement experiments reported in Table VI were carried out.

In Table VI, column 2 gives the weight of sand in grams in the tube, column 3 the pore volume of the sand pack in cubic centimeters. Data characterizing the primary displacing fluid employed are set forth in columns 4-8. Column 9 sets forth the amount of surfactant injected in milligrams of surfactant per gram of sand, and column 10 indicates the oil recovery calculated as a percentage of the waterflood residual oil saturation.

For each of Runs 1 and 5-10 reported in Table VI, the primary displacing fluid was distilled water to which had been added 1.4 weight percent mixed salts composed of 0.6 percent sodium chloride, 0.6 percent sodium carbonate, and 0.2 percent sodium tripolyphosphate. In Runs 2, 3, and 12-15, the primary displacing fluid contained 1.2 weight percent mixed salts (0.8 percent sodium chloride, 0.2 percent sodium carbonate, and 0.2 percent sodium tripolyphosphate) and in Run 4, 1.4 weight percent mixed salts (1.0 percent sodium chloride, 0.2 percent sodium carbonate, and 0.2 percent sodium tripolyphosphate). Columns 4 and 5 of the Table set forth, respectively, the volumes in cubic centimeters and the fractional pore volumes of the slug or slugs comprising the primary displacing fluid. Column 6 gives the surfactant concentration. Column 7 sets forth the alcohol concentration in weight percent and column 8 gives the viscosity in centipoises of each slug. For each tube run, the surfactant employed was the petroleum sulfonate Witco TRS 10-80 and the alcohol employed was n-butyl alcohol. In each experiment, after the primary displacing fluid was injected in the amounts indicated, the run was carried to conclusion with the injection of an aqueous solution of 0.6 weight percent sodium chloride as the driving fluid. In Runs 2, 3, and 4, the driving fluid contained 0.05 weight percent of a biopolymer to provide a viscosity of about 16 centipoises. In the remaining runs the driving fluid was not thickened. For Runs 2 and 7, the weight of sand in the tube was not measured directly but was calculated using values proportional to the sand weights and pore volumes of other sand packs.

TABLE VI

| Run No. | Sand Wt. | Pack PV | Displacing Fluid | | | | | Surf. Inj. | Oil Rec. |
| | | | Vol. | PV | Surf. Conc. | Alc. Conc. | Visc. | | |
| --- | --- | --- | --- | --- | --- | --- | --- | --- | --- |
| 1 | 2 | 3 | 4 | 5 | 6 | 7 | 8 | 9 | 10 |
| 1 | 52.0 | 12.0 | 3.8 | .32 | 1.5 | 2.25 | 52 | | |
| | | | 1.9 | .16 | 1.225 | 1.83 | 12 | | |
| | | | 3.0 | .25 | 0.95 | 1.42 | 6 | 2.09 | 95+ |
| 2 | 51+ | 11+ | 3.7 | .34 | 1.5 | | 1 | 1.1 | 62.5 |

TABLE VI-continued

| Run No. | Sand Wt. | Pack PV | Vol. | PV | Surf. Conc. | Alc. Conc. | Visc. | Surf. Inj. | Oil Rec. |
|---|---|---|---|---|---|---|---|---|---|
| 1 | 2 | 3 | 4 | 5 | 6 | 7 | 8 | 9 | 10 |
| 3 | 48.8 | 10.9 | 2.0 | .18 | 1.5 | | 1 | 0.61 | 37 |
| 4 | 48.4 | 10.4 | 1.95 | .19 | 1.5 | | 1 | 0.60 | 31.7 |
| 5 | 52.4 | 11.25 | 1.55 | .14 | 1.5 | 1.83 | 20 | | |
| | | | 1.55 | .14 | 1.375 | 1.68 | 12 | | |
| | | | 1.15 | .10 | 1.375 | 1.37 | 7 | | |
| | | | 1.1 | .10 | 0.5 | 0.61 | 3 | 1.25 | 83.9 |
| 6 | 52.7 | 11.8 | 2.6 | .22 | 1.5 | | 1 | | |
| | | | 1.2 | .10 | 0.5 | | 1 | 0.85 | 45.5 |
| 7 | 48.3 | 10.5 | 1.6 | .15 | 1.5 | | | | |
| | | | 0.7 | .07 | 1.5 | 1.83 | 22 | | |
| | | | 0.65 | .06 | 1.375 | 1.68 | 24 | | |
| | | | 0.6 | .06 | 1.375 | 1.37 | 8 | | |
| | | | 1.1 | .10 | 0.5 | 0.61 | 2 | 1.18 | 90 |
| 8 | 48.2 | 10.5 | 4.05 | .39 | 1.5 | 1.0 | 1 | 1.26 | 71.7 |
| 9 | 51.9 | 11.55 | 4.2 | .36 | 1.5 | | 1 | 1.21 | 68.3 |
| 10 | 48.7 | 10.6 | 2.0 | .19 | 1.5 | | | | |
| | | | 1.0 | .09 | 1.5 | 1.83 | >2 | | |
| | | | 1.0 | .09 | 1.5 | 1.68 | >2 | 1.23 | 72.6 |
| 11 | 50.8 | | 3.7 | | 1.5 | | 1 | 1.09 | 48.5 |
| 12 | 51.9 | 11.7 | 1.8 | .15 | 1.5 | | 1 | | |
| | | | 1.0 | .09 | 1.5 | 1.375 | 35 | | |
| | | | 1.0 | .09 | 1.5 | 1.0 | 20 | 1.10 | 76.7 |
| 13 | 48.5 | 10.9 | 0.8 | .07 | 1.5 | | | | |
| | | | 0.5 | .05 | 1.5 | 1.375 | 35 | | |
| | | | 0.5 | .05 | 1.5 | 1.0 | 20 | .55 | 31.8 |
| 14 | 50.1 | 11.0 | 2.67 | .24 | 1.5 | | 1 | | |
| | | | 0.6 | .05 | 1.5 | 1.375 | 35 | | |
| | | | 0.4 | .04 | 1.5 | 1.0 | 20 | 1.10 | 66.7 |
| 15 | 46.8 | 11.1 | 1.6 | .14 | 1.5 | | 1 | | |
| | | | 0.55 | .05 | 1.5 | 1.375 | 35 | | |
| | | | 0.45 | .04 | 1.5 | 1.0 | 20 | .83 | 63.6 |

In reviewing the data presented in Table VI, it is to be recognized that the percent oil recovery given in column 10 is an indication of the overall efficiency of the displacement process whereas a comparison of the data presented in both columns 9 and 10 gives an indication of the displacement efficiency in terms of the amount of surfactant employed. Run 1 illustrates a displacement process simulative of the present invention in which an aged alcohol-surfactant system was injected in three slugs with trailing edge viscosity gradation. Runs 2, 3, and 4 are illustrative of the prior art practice of injecting a surfactant slug first and following this with a mobility control slug containing a polymeric thickening agent. A comparison of Run 1 with Runs 2-4 illustrates the significantly higher oil recovery achieved by employing the alcohol-surfactant system. It will be recognized that Run 1 also employed a significantly higher quantity of surfactant than was employed in Runs 2-4.

Run 5 illustrates a displacement procedure carried out similar to that employed in Run 1 but employing a quantity of surfactant much closer to that employed in Run 2. The oil recovery in this case was lower than that attained in Run 1, presumably because of the lower surfactant usage, but still significantly above that achieved in Run 2. Run 6 illustrates a displacement process carried out employing a surfactant slug (without alcohol) injected in two increments of decreasing surfactant concentration. The surfactant slug was then displaced by drive water comprising a 0.6 percent sodium chloride solution without thickening agent.

Run 7 was carried out employed an injection format similar to that used in Run 5 with the exception that the alcohol-surfactant slugs were preceded with a surfactant slug injected in an amount of 0.15 pore volume. In this case, 90 percent oil recovery was attained employing 1.18 milligrams of surfactant per gram of rock as compared with an oil recovery of 83.9 percent with Run 5 employing a slightly greater amount of surfactant.

Run 8 was a displacement test employing a mixture of alcohol and surfactant injected in an aqueous solution as an unaged slug. Run 9 involved the injection of a surfactant slug (without alcohol) in which the subsequently injected driving fluid was composed of a solution of 2 percent n-butyl alcohol in water. Both the surfactant slug and the aqueous solution of alcohol were unaged. In Run 10, the injection format was somewhat similar to that used in Run 7 in that a surfactant slug was injected first, followed by a surfactant-alcohol slug. However in Run 10, as in Run 8, the surfactant and surfactant-alcohol mixtures were injected as unaged slugs having a viscosity of approximately 1 centipoise. As indicated in column 10 of Table VI, oil recovery for Run 10 was significantly less than that observed for Run 7 although still greater than the recoveries achieved in Runs 2-4 and 6.

Runs 11 through 15 are similar to each other and to previously described Runs 2 and 3 in the use of a mixed salt solution containing 0.8 weight percent sodium chloride, 0.2 weight percent sodium carbonate, and 0.2 weight percent sodium tripolyphosphate. The results of Runs 2, 11, 12 and 14 may be compared directly in terms of the amount of surfactant used (about 1.1 milligrams per gram of rock) as well as the surfactant concentration in the primary displacing fluid and the volume amount of surfactant solution injected. Runs 12 and 14 which involved the injection of a surfactant slug followed by a surfactant-alcohol slug produced recoveries of 76.7 and 66.7 percent, respectively, as compared to 62.5 percent for Run 2 which involved a surfactant slug followed by polymer-thickened water and 48.5 percent for Run 11 which involved a surfactant slug followed by unthickened water.

Table VII shows the results of a second suite of displacement experiments carried out at 88° F. and employing in each run a 1.2 percent mixed salt solution containing 0.8 weight percent sodium chloride, 0.2 weight percent sodium tripolyphosphate, and 0.2 weight percent sodium carbonate. The experimental protocol employed for Runs 16 through 27 was the same as that employed for Runs 1 through 15 of Table VI, and columns 2-10 of Table VII present the same data as set forth in the corresponding columns of Table VI.

TABLE VII

| Run No. | Sand Wt. | Pack PV | Displacing Fluid | | | | | Surf. Inj. | Oil Rec. |
|---|---|---|---|---|---|---|---|---|---|
| | | | Vol. | PV | Surf. Conc. | Alc. Conc. | Visc. | | |
| 1 | 2 | 3 | 4 | 5 | 6 | 7 | 8 | 9 | 10 |
| 16 | 50.6 | | 2.7 | | 1.5 | | 1 | | |
| | | | 0.5 | | 1.5 | 1.375 | 28 | | |
| | | | 0.5 | | 1.5 | 1.0 | 20 | 1.10 | 77.4 |
| 17 | 47.7 | 11.2 | 2.5 | .22 | 1.5 | | 1 | | |
| | | | 0.5 | .04 | 1.5 | 1.375 | 28 | | |
| | | | 0.5 | .04 | 1.5 | 1.0 | 20 | 1.10 | 57.9 |
| 18 | 48.2 | 11.1 | 3.5 | .32 | 1.5 | | 1 | 1.09 | 61.8 |
| 19 | 50.8 | 11.3 | 1.7 | .15 | 1.5 | | 1 | | |
| | | | 0.77 | .07 | 1.5 | 1.375 | 28 | | |
| | | | 0.24 | .02 | 1.5 | 1.0 | 20 | .80 | 40.7 |
| 20 | 48.0 | 11.0 | 1.52 | .14 | 1.5 | | 1 | | |
| | | | 1.0 | .09 | 1.5 | 1.375 | 28 | | |
| | | | 1.0 | .09 | 1.5 | 1.0 | 20 | 1.10 | 82.1 |
| 21 | 51.0 | 11.2 | 3.75 | .33 | 1.5 | | 1 | 1.10 | 76.1 |
| 22 | 50.5 | | 1.7 | | 1.5 | | 1 | | |
| | | | 1.0 | | 1.5 | | 1 | | |
| | | | 1.0 | | 1.5 | | 1 | 1.10 | 61.7 |
| 23 | 51.1 | 11.9 | 0.72 | .06 | 1.5 | | 1 | | |
| | | | 1.0 | .08 | 1.5 | 1.375 | 28 | | |
| | | | 1.0 | .08 | 1.5 | 1.0 | 20 | .80 | 49.1 |
| 24 | 48.0 | 10.5 | 1.12 | .11 | 1.5 | | 1 | | |
| | | | 0.8 | .08 | 1.5 | 1.375 | 28 | | |
| | | | 0.9 | .09 | 1.5 | 1.0 | 20 | .88 | 61.3 |
| 25 | 49.6 | 10.9 | 1.15 | .11 | 1.5 | | 1 | | |
| | | | 0.75 | .07 | 1.5 | 1.375 | 28 | | |
| | | | 0.3 | .03 | 1.5 | | 1 | | |
| | | | 0.5 | .05 | 1.5 | 1.0 | 20 | .82 | 63.3 |
| 26 | 52.3 | 11.5 | 3.84 | .33 | 1.5 | | 1 | 1.10 | 52.5 |
| 27 | 51.6 | 12.0 | 1.0 | .08 | 1.5 | 1.375 | 28 | | |
| | | | 1.0 | .08 | 1.5 | 1.0 | 20 | | |
| | | | 1.78 | .15 | 1.5 | | 1 | 1.10 | 56.4 |

As can be seen from an examination of columns 6 and 7 of Table VII, Runs 16, 17, 19, 20, 23, and 24 involve the injection of a surfactant slug followed by graded surfactant-alcohol slugs. Run 25 involved the injection of two surfactant slugs, each followed by a surfactant-alcohol slug. Run 27 involved the injection of graded alcohol-surfactant slugs followed by a surfactant slug containing no alcohol. In each of Runs 16 through 20 and Runs 23 and 24, the driving fluid employed to carry the displacement test to completion was unthickened water. In Runs 21, 22, 25, 26, and 27, polymer-thickened water was employed as the driving fluid. The polymer concentration was graded in Runs 22, 25, and 27 to provide a viscosity gradation from a maximum of 16 centipoises down to that of water. In Runs 21 and 26, the polymer concentration was maintained at a constant level to provide a viscosity of about 16 centipoises. It is believed that the generally lower oil recoveries reported in Table VII and also in Runs 11 through 15 of Table VI reflect the lower concentration of sodium carbonate employed in the surfactant slug. Thus it will be recognized that sacrificial agents such as sodium carbonate and sodium tripolyphosphate can be employed to advantage in the present invention similarly as in low tension waterflooding techniques such as described in the aforementioned paper by Foster.

The present invention may be carried out utilizing injection and production systems as defined by any suitable arrangement of wells. One well arrangement commonly used in waterflooding operations and suitable for use in carrying out the present invention is an integrated five-spot pattern of the type illustrated in FIG. 12. In this Figure, the legend o is used to indicate a production well and the legend • is used to indicate an injection well. As shown in FIG. 12, this integrated pattern comprises a plurality of five-spot patterns, each of which comprises a central production well as indicated by reference character 30 and four peripheral injection wells as indicated by reference numerals 32, 33, 34, and 35. The term "pore volume," as used herein to define the quantities of fluids injected in carrying out the invention, designates the pore volume of the formation underlying the well pattern defined by the wells comprising the injection and production systems. Thus the term "pore volume" as used with reference to the pattern shown in FIG. 12 is the pore volume of that portion of the formation underlying the area enclosed by broken line 36.

Of course, other well arrangements may be used in carrying out the present invention such as the direct or staggered line drive patterns, the four-spot, seven-spot, or nine-spot patterns, or circular flood patterns. For further description of these and other well arrangements which may be employed in waterflooding, reference is made to Calhoun, J. C., Jr., FUNDAMENTALS OR RESERVOIR ENGINEERING, Univ. of Oklahoma Press, Norman (1960), pp. 371-376, and Uren, L. C., PETROLEUM PRODUCTION ENGINEERING — OIL FIELD EXPLOITATION, McGraw-Hill Book Co., Inc., New York, Toronto and London (1953), pp. 528-534. It is to be recognized also that the invention may be carried out utilizing dually completed injection-production wells of the type disclosed, for example, in U.S. Pat. No. 2,725,106 to Spearow. This arrangement may sometimes be utilized to advantage in relatively thick reservoirs in which it is desirable to displace the oil in the reservoir upwardly and recover the oil from the upper portion of the reservoir.

The slug sizes employed in carrying out the invention may vary depending upon the conditions encountered in a particular reservoir and the surfactant and alcohol concentrations used. Where the surfactant slug of relatively little or no alcohol content is injected ahead of the relatively viscous surfactant-alcohol slug, it usually will be preferred to inject the surfactant slug in an amount within the range of 0.05 to 0.15 pore volume. Where the reservoir water exhibits a relatively high salinity inconsistent with that required for the desired low interfacial tension, or where the reservoir brine has an unacceptably high divalent ion content, e.g. in excess of 50 to 100 ppm, the surfactant slug may be preceded by a protective slug as taught for example in the aforementioned paper by Foster. The protective slug, if employed, normally will be injected in an amount within the range of 0.1 to 0.5 pore volume. The thickened sulfonate-alcohol slug preferably is injected in an amount within the range of 0.15 to 0.5 pore volume. Subsequent to the injection of this slug, an aqueous driving fluid may then be injected in order to displace the previously injected fluid through the reservoir. The driving fluid may be any water which is locally available and not incompatible with the formation and may be injected in such amounts as is necessary to carry the process to completion.

We claim:

1. In a method for the recovery of oil from a subterranean oil reservoir penetrated by spaced injection and production systems wherein an aqueous fluid is introduced into said reservoir via said injection system to displace oil to said production system, the improvement comprising employing as at least a portion of the fluid introduced into said injection system a viscous aqueous fluid having a monovalent salt salinity within the range of 0.8–2.5 weight percent and containing an alkyl aryl sulfonate surfactant having an average molecular weight within the range of 350–500 in a concentration within the range of 0.5–3.0 weight percent and a water-soluble $C_4$-$C_6$ aliphatic alcohol having a hydrocarbon chain length of at least 3 carbon atoms in a concentration to provide a ratio $\phi$ of said sulfonate surfactant to the sum of said sulfonate surfactant and said alcohol within the range of 0.3–0.8.

2. The method of claim 1 wherein said aliphatic alcohol comprises butyl alcohol in a concentration to provide a ratio $\phi$ within the range of 0.3–0.6.

3. The method of claim 2 wherein said aliphatic alcohol is n-butyl alcohol.

4. The method of claim 1 wherein said viscous aqueous liquid is free of oil or contains less than 0.8 weight percent of oil.

5. The method of claim 1 wherein said sulfonate surfactant is present in a concentration within the range of 1.0–2.0 weight percent and said aliphatic alcohol comprises butyl alcohol in a concentration to provide a ratio $\phi$ within the range of 0.3–0.5.

6. The method of claim 1 wherein the viscosity of a rear portion of said viscous aqueous fluid is progressively decreased by varying at least one of the monovalent salt salinity, the sulfonate surfactant concentration, and the aliphatic alcohol concentration.

7. The method of claim 6 wherein the viscosity of said rear portion is decreased by decreasing the monovalent salt salinity.

8. The method of claim 6 wherein the viscosity of said rear portion is decreased by decreasing the aliphatic alcohol concentration.

9. The method of claim 6 wherein the viscosity of said portion is decreased by decreasing the aliphatic alcohol concentration to provide an increase in said ratio $\phi$.

10. The method of claim 6 wherein the viscosity of a front of said viscous aqueous fluid is progressively increased by increasing the aliphatic alcohol concentration to provide a decrease in said ratio $\phi$.

11. In the recovery of oil from a subterranean oil reservoir penetrated by spaced injection and production systems, the method comprising:
 a. injecting into said reservoir via said injection system an aqueous surfactant slug containing a sulfonate surfactant,
 b. thereafter injecting into said reservoir via said injection system an aqueous mobility control slug having a monovalent salt salinity within the range of 0.5–3.0 weight percent and exhibiting a viscosity greater than the viscosity of said surfactant slug, said mobility control slug containing an alkyl aryl sulfonate surfactant having an average molecular weight within the range of 350–500 in a concentration within the range of 0.5–4.0 weight percent and a water-soluble $C_4$-$C_6$ aliphatic alcohol having a hydrocarbon chain length of at least 3 carbon atoms in a concentration to provide a ratio $\phi$ of said sulfonate surfactant to the sum of said sulfonate surfactant and said alcohol within the range of 0.3–0.8,
 c. thereafter injecting into said reservoir via said injection system an aqueous flooding medium to displace oil to said production system, and
 d. recovering oil from said production system.

12. The method of claim 11 wherein said surfactant slug has a monovalent salt salinity within the range of 0.5–3.0 weight percent and contains said sulfonate surfactant in a concentration within the range of 0.5–4.0 weight percent.

13. The method of claim 11 wherein said surfactant slug is injected in an amount within the range of 0.05–0.15 pore volume.

14. The method of claim 13 wherein said mobility control slug is injected in an amount within the range of 0.15–0.5 pore volume.

15. The method of claim 11 wherein said aliphatic alcohol comprises butyl alcohol in a concentration to provide a ratio $\phi$ within the range of 0.3–0.6.

16. The method of claim 15 wherein said aliphatic alcohol is n-butyl alcohol.

17. The method of claim 11 wherein said sulfonate surfactant is present in a concentration within the range of 1.0–2.0 weight percent and said aliphatic alcohol comprises butyl alcohol in a concentration to provide a ratio $\phi$ within the range of 0.3–0.5.

18. In a method for the recovery of oil from a subterranean oil reservoir penetrated by spaced injection and production systems wherein an aqueous fluid is introduced into said reservoir via said injection system to displace oil to said production system, the improvement comprising:
 a. formulating an aqueous fluid having a monovalent salt salinity within the range of 0.5–3.0 weight percent and containing an alkyl aryl sulfonate surfactant having an average molecular weight within the range of 350–500 in a concentration within the range of 0.5–4.0 weight percent and a water-soluble $C_4$-$C_6$ aliphatic alcohol having a hydrocarbon chain length of at least 3 carbon atoms in a concentration to provide a ratio $\phi$ of said sulfonate surfactant to the sum of said sulfonate surfactant and said alcohol within the range of 0.3–0.8,
 b. aging the fluid formulated in step (a) to allow the viscosity of said fluid to increase, and c. employing said aged viscous fluid as at least a portion of the fluid introduced into said injection system.

19. The method of claim 18 wherein the aging procedure of step (b) is carried out at an elevated temperature to accelerate the viscosity development of said fluid.

20. The method of claim 18 wherein said fluid is aged in step (b) at a temperature within the range of 90°–150° F.

21. The method of claim 18 wherein said fluid is aged in step (b) for a period of at least 1 day.

* * * * *

UNITED STATES PATENT AND TRADEMARK OFFICE
CERTIFICATE OF CORRECTION

PATENT NO. : 4,042,030

DATED : August 16, 1977

INVENTOR(S) : Joseph George Savins, Ralph F. Burdyn, Jerry M. Waite

It is certified that error appears in the above–identified patent and that said Letters Patent are hereby corrected as shown below:

Column 3, line 53, "than the" should read --than that--.

Column 4, line 39, "comprising-butyl" should read --comprising n-butyl--.

Column 7, line 58, "K' " should read --k'--.

Column 14, line 14, "or not" should read --or no--;
line 17, "aging of" should read --aging at--.

Column 15, line 6, after "weight" insert --percent--;
line 17, "of 8," should read --at 8,--.

Column 19, Run 23, under column 8, insert --1--.

Column 21, line 66 (claim 9), after "said" insert --rear--.

Column 22, line 2 (claim 10), after "front" insert --portion--.

Signed and Sealed this

Fifteenth Day of November 1977

[SEAL]

Attest:

RUTH C. MASON
*Attesting Officer*

LUTRELLE F. PARKER
*Acting Commissioner of Patents and Trademarks*